United States Patent
Bateman et al.

(10) Patent No.: US 10,711,876 B1
(45) Date of Patent: Jul. 14, 2020

(54) REINFORCEMENT SEALING TUBES FOR STABILIZING A HOUSING IN AN AUTOMOBILE TRANSMISSION

(71) Applicant: Seal Aftermarket Products, LLC, Pembroke Park, FL (US)

(72) Inventors: Robert Bateman, Deerfield Beach, FL (US); Thomas Tejada, Plantation, FL (US); Michael Souza, Sunrise, FL (US)

(73) Assignee: SAPTFC HOLDING, LLC, Pembroke Park, FL (US)

( * ) Notice: Subject to any disclaimer, the term of this patent is extended or adjusted under 35 U.S.C. 154(b) by 0 days.

(21) Appl. No.: 16/665,664

(22) Filed: Oct. 28, 2019

(51) Int. Cl.
*F16H 57/02* (2012.01)
*F16H 57/04* (2010.01)
*F16L 41/08* (2006.01)

(52) U.S. Cl.
CPC ............ *F16H 57/02* (2013.01); *F16H 57/04* (2013.01); *F16L 41/088* (2013.01); *F16H 2057/02026* (2013.01); *F16H 2057/02043* (2013.01)

(58) Field of Classification Search
CPC .................................................. F16L 19/0237
USPC .... 285/124.5, 192, 193, 201, 211, 212, 220, 285/351, 370, 120.1, 19, 20, 30
See application file for complete search history.

(56) References Cited

U.S. PATENT DOCUMENTS

| | | | | | |
|---|---|---|---|---|---|
| 2,470,800 | A | * | 5/1949 | Ashton | F16L 29/00 285/192 |
| 2,525,951 | A | * | 10/1950 | Sanborn | F16L 27/1017 285/146.2 |
| 3,074,748 | A | * | 1/1963 | Ulrich | F16L 15/008 285/347 |
| 3,841,667 | A | * | 10/1974 | Sands | F16L 41/14 285/39 |
| 4,289,334 | A | * | 9/1981 | Riley | F16L 58/188 285/141.1 |
| 4,627,644 | A | * | 12/1986 | Ekman | F16L 37/0925 285/24 |
| 4,697,423 | A | * | 10/1987 | Conrad | F02B 33/44 60/605.2 |
| 4,707,000 | A | * | 11/1987 | Torgardh | F16L 37/088 285/305 |
| 5,000,488 | A | * | 3/1991 | Albrecht | F16L 23/0283 285/12 |

(Continued)

OTHER PUBLICATIONS

Bower, E. and Vandermar, B., "Reciprocating and Static Seal Designs of Elastomeric Compounds," SAE Technical Paper 620109, 1962, pp. 365-379.

(Continued)

*Primary Examiner* — Aaron M Dunwoody
(74) *Attorney, Agent, or Firm* — Burr & Forman LLP; Jeffrey H. Kamenetsky

(57) ABSTRACT

At least one reinforcement tube for stabilizing a housing within an automobile transmission casing. The reinforcement tube includes a first portion having a first diameter and having a first interior recess, a second portion having a second diameter that is larger than the first diameter, and a second interior recess, the first and second portions separated by a shoulder, a first seal disposed within the first interior recess of the first portion and situated proximate the shoulder separating the first and second portions, and a second seal separate from the first seal and situated proximate a distal end of the second portion.

11 Claims, 8 Drawing Sheets

(56) References Cited

U.S. PATENT DOCUMENTS

| | | | | |
|---|---|---|---|---|
| 5,000,490 A * | 3/1991 | Albrecht | F16L 23/0283 | 285/212 |
| 5,165,731 A * | 11/1992 | Kimuta | F16B 33/02 | 285/220 |
| 5,251,695 A * | 10/1993 | Coronado | E21B 17/04 | 166/242.6 |
| 5,346,260 A * | 9/1994 | Meyer-Berg | B67D 7/42 | 285/1 |
| 5,433,489 A * | 7/1995 | Kimura | F16L 15/008 | 285/220 |
| 5,441,314 A * | 8/1995 | Giovanni | F16L 41/10 | 277/641 |
| 5,564,753 A * | 10/1996 | Juttelstad | F16L 59/141 | 285/120.1 |
| 5,865,477 A * | 2/1999 | Ko | E03C 1/0401 | 137/801 |
| 6,367,844 B1 * | 4/2002 | Smeltzer, III | F16L 17/00 | 285/351 |
| 6,467,819 B2 * | 10/2002 | Seifert | B29C 45/1676 | 264/242 |
| 6,769,721 B2 * | 8/2004 | Guest | F16L 33/18 | 285/239 |
| 7,454,907 B1 * | 11/2008 | Hauser | B60K 17/105 | 60/487 |
| 7,588,253 B2 * | 9/2009 | Bottura | F16L 41/10 | 277/609 |
| 7,762,277 B2 * | 7/2010 | Yoshida | F04B 17/05 | 137/545 |
| 8,215,454 B2 * | 7/2012 | Portlock | F01D 25/18 | 184/6.12 |
| 8,356,842 B2 * | 1/2013 | Carns | B64D 39/06 | 285/189 |
| 8,776,637 B2 * | 7/2014 | Juhassz | F16D 25/12 | 137/614.05 |
| 8,904,896 B2 * | 12/2014 | Ohno | E02F 9/202 | 475/230 |
| 9,885,439 B2 * | 2/2018 | Joh | F16L 41/10 | |
| 2002/0171241 A1 * | 11/2002 | Duong | F24H 9/2035 | 285/305 |
| 2003/0193187 A1 * | 10/2003 | Takada | F16L 37/56 | 285/120.1 |
| 2009/0108580 A1 * | 4/2009 | Hoffman | F16L 37/088 | 285/277 |
| 2010/0270795 A1 * | 10/2010 | Itou | F16L 19/005 | 285/401 |
| 2013/0019973 A1 * | 1/2013 | Gose | F16L 37/23 | 137/798 |
| 2015/0240571 A1 * | 8/2015 | Bowles | E21B 17/04 | 285/351 |
| 2016/0109044 A1 * | 4/2016 | Danelli | E02F 3/3654 | 137/594 |

OTHER PUBLICATIONS

Sonnax® Company Brochure for Zip Kit Instructions, Part Nos. 6L45, 6L50, 6L80, 6L90, 2017, Sonnax Industries, Inc., pp. 2-3.
Whatever It Takes Transmission Parts, Inc. Company Brochure for RWD 6 Speed, Part Nos. 6L45, 6L50, 6L80, 6L90, pp. 252-253.

\* cited by examiner

REINFORCEMENT SEALING TUBES FOR STABILIZING A HOUSING IN AN AUTOMOBILE TRANSMISSION

TECHNICAL FIELD

This disclosure relates to automotive vehicles, and more specifically, to reinforcement sealing tubes that connect a housing to the casing of an automobile transmission in order to reduce or eliminate movement of the housing and thus eliminate transmission wear and leakage of transmission fluid.

BACKGROUND

In automobile transmissions, the housing contains the different components applied to execute shifts into the different gears that are associated with it. For example, the housing in this application contains on one side, the components that are applied during shifts into $2^{nd}$ and $6^{th}$ gears and on the other side those to engage low gear and reverse, and other components within the transmission. These components are referred to as the 2-6 clutch and the low/reverse clutch. Within each of these clutches are subcomponents involved in the shifting process.

The housing is mounted into the transmission case held in place via six radially located alignment lugs and held in that position by a thick steel gage snap ring. In certain transmissions, there is also a bolt or bolts that connect the housing to the transmission case. However, in other transmissions, such as, for example, the General Motors® 6 L transmission series, the housing is not bolted to the transmission case. When there is no bolt, typically, a sealing sleeve is used in a channel and compressed between a valve body and the housing to seal both ends. The valve body is the control center of automatic transmissions. It contains many components that direct hydraulic fluid to the numerous valves which then activate the appropriate clutch pack to shift to the appropriate gear for each driving situation. It is essential that there be a hydraulic circuit between the valve body and the housing.

However, in many instances, due to the movement of the housing in high torque applications, the alignment lugs on the housing and case wear. When the alignment lugs wear, the housing tends to move as torque is transferred through the drivetrain. This movement causes damage to the oil transfer tube seals. Once these seals become damaged, the transmission fluid will leak and not adequately flow into the housing and its components. This results in a loss of fluid pressure and the engagement of gears will not occur correctly, thus damaging components. Currently, there is no adequate solution that prevents movement of the housing in transmissions where the housing is not bolted to the transmission casing. Thus, there is a need for a mechanism that prevents such movement of the housing. The present disclosure addresses this need.

SUMMARY

In one aspect of the present disclosure, a reinforcement tube for stabilizing a housing within an automobile transmission casing is provided. The reinforcement tube includes a first portion having a first diameter and having a first interior recess, a second portion having a second diameter that is larger than the first diameter, and a second interior recess, the first and second portions separated by a shoulder, a first seal disposed within the first interior recess of the first portion and situated proximate the shoulder separating the first and second portions, and a second seal separate from the first seal and situated proximate a distal end of the second portion.

In another aspect, an attachment mechanism for stabilizing a housing within an automobile transmission casing is provided. The attachment mechanism includes a plurality of reinforcement tubes configured to be secured within corresponding oil feed holes in a housing and alignment holes in a transmission case thereby joining the housing to the transmission case. Each reinforcement tube includes a first portion having a first diameter and having a first interior recess, a second portion having a second diameter that is larger than the first diameter, and a second interior recess, the first and second portions separated by a shoulder, a first seal disposed within the first interior recess of the first portion and situated proximate the shoulder separating the first and second portions, and a second seal separate from the first seal and situated proximate a distal end of the second portion.

DETAILED DESCRIPTION OF EXEMPLARY EMBODIMENTS

The present disclosure provides a plurality of reinforcement tubes, i.e., an attachment mechanism that is configured to connect a housing to a transmission case in an automobile in order to stabilize the housing and prevent unwanted movement of the housing, which results in seal wearing and leakage of transmission fluid in certain automatic transmissions. The present disclosure describes reinforcement tubes that include two or more seals, such as, for example, O-rings, which seal the housing and the valve body. The reinforcement tubes are pressed into the transmission case as well as the housing, thus locking the housing to the transmission case. Each reinforcement tube uses a first seal to seal the housing. The valve body is then bolted to the transmission case securing the tubes and sealing the valve body with a second seal. The reinforcement tubes of the present disclosure not only stabilize the housing but also provide a stable hydraulic circuit between the valve body and the housing. While the reinforcement tubes described herein may be used in automatic transmissions for vehicles, the present disclosure is not limited in this regard and the reinforcement tubes may be used in other applications.

Figure 1:
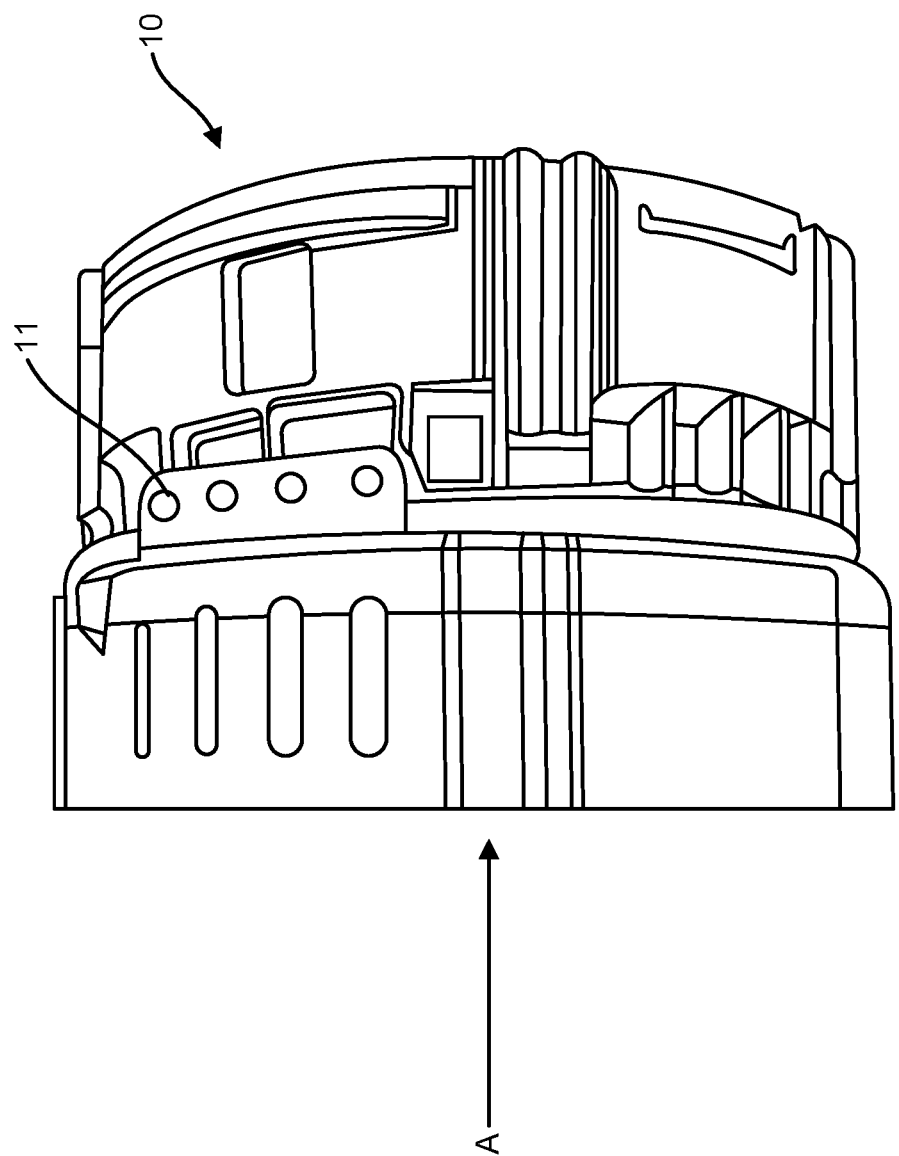
FIG. 1 is an illustration of a typical housing through which the reinforcement tubes of the present disclosure are inserted.

An illustration of a typical housing 10 is shown in FIG. 1. Housing 10 includes a series of oil feed holes 11 centrally disposed on a flange extending from the body of housing 10.

Figure 2:
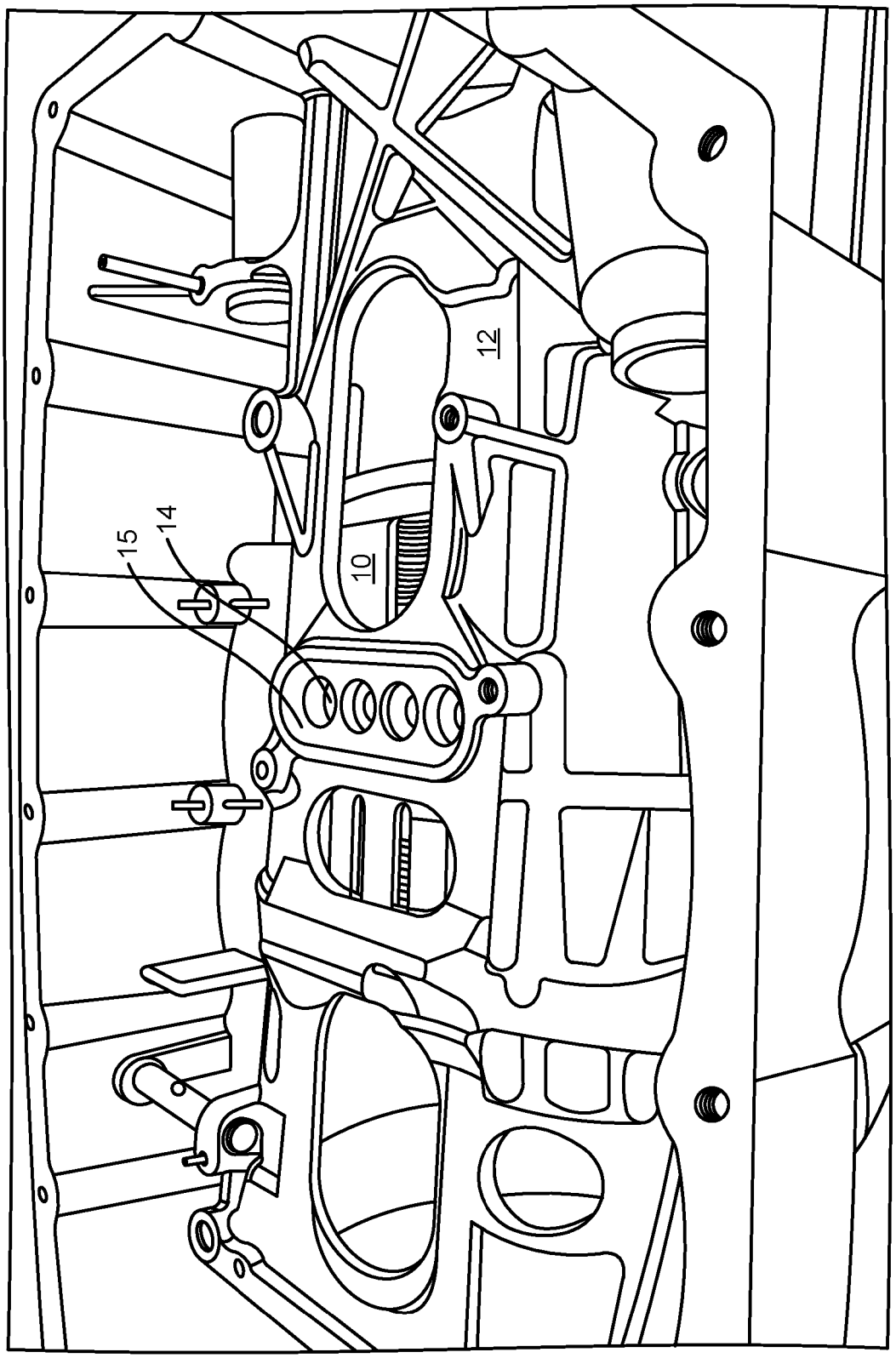
FIG. 2 is an illustration showing a typical housing inserted at least part way within a transmission casing with no bolt connecting the two components.

Referring now to FIG. 2, housing 10 can be seen disposed at least partially within a transmission case 12 of an automobile. In certain transmissions, such as, for example the 6 L transmission series by General Motors®, there is no bolt connecting housing 10 to transmission case 12. Instead, the two components are joined by a series of alignment lugs (not shown). Because there is no bolt connecting housing 10 to transmission case 12, unwanted movement of housing 10 may occur in high torque situations. Movement of housing 10 will cause damage to any seals that are used to seal housing 10 to a valve body (13, shown in FIG. 8), leading to unwanted leakage of transmission fluid.

As can be seen in FIG. 2, when housing 10 is placed within transmission case 12, the housing oil feed holes 11 (shown in FIG. 1) are aligned with a series of transmission case alignment holes 14. It is within the aligned oil feed holes 11 and transmission case alignment holes 14 that the reinforcement tubes of the present disclosure will be installed. Referring back to FIG. 1, in one embodiment, if need be, oil feed holes 11 of housing 10 can be drilled out in order to allow a plurality of the reinforcement tubes to be inserted therein such that an interference fit between oil feed holes 11 and the first portion 18 (shown in FIG. 3) of the reinforcement tubes is provided. The reinforcement tubes, as will be described in greater detail below, will provide a connection between housing 10 and transmission case 12 and transmission case 12 to valve body 13, which is bolted to the bottom of transmission case 12 securing the sealing element 32 (shown in FIG. 4) to the reinforcement tubes ensuring a stable hydraulic seal. It is important to eliminate any motion of housing 10 in order provide a stable seal between the valve body 13 and the housing 10 because the connection between the valve body 13 and housing 10 completes a hydraulic circuit between these two components.

Figure 3:
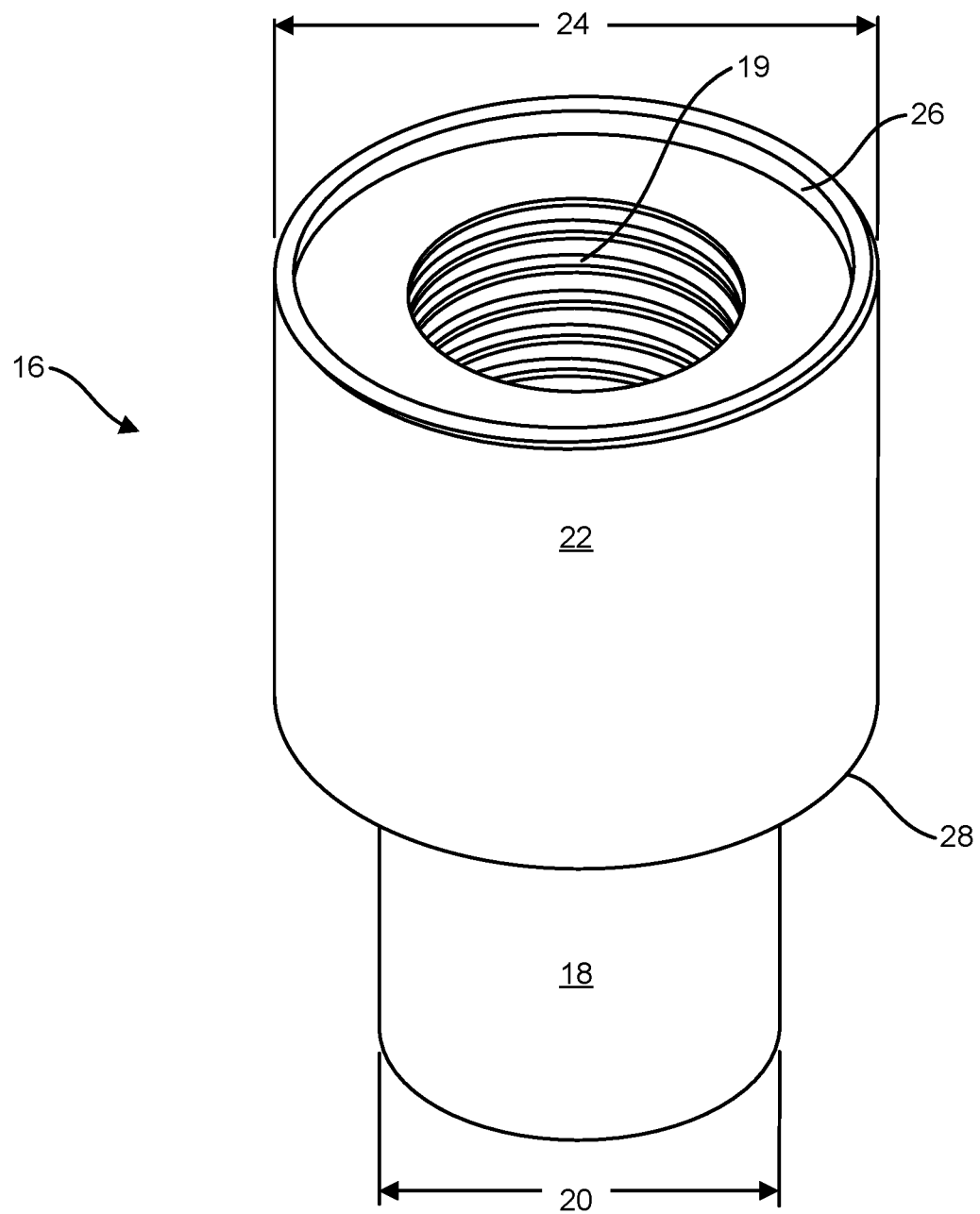
FIG. 3 is a front perspective view of a reinforcement tube in accordance with the principles of the present disclosure.

FIG. 3 is a front perspective view of an exemplary reinforcement tube 16 of the present disclosure. Reinforcement tube 16 includes a first portion 18 having a first diameter 20 and a second portion 22 having a second diameter 24 that is larger than first diameter 20. In one embodiment, first portion 18 has a first interior recess (not shown in FIG. 3) configured to receive a seal such as a first O-ring, while second portion 22 has a second interior recess 26 configured to receive a seal such as a second O-ring (first and second O-rings shown in FIG. 4). In one embodiment, first portion 18 and second portion 22 are separated by a shoulder 28. In one embodiment, interior threads 19 are used to install or remove each reinforcement tube 16.

In one embodiment, reinforcement tubes 16 are made of steel and can be configured in size and dimensions in order to fit within the oil feed holes 11 of housing 10 and the alignment holes 14 of transmission case 12 respectively. For example, in one embodiment, reinforcement tubes 16 are 21.50 mm or 23.50 mm in height (this includes both first portion 18 and second portion 22), and first portion 18 has a diameter of 10 mm and second portion 22 has a diameter of 15 mm. These dimensions are exemplary only and the reinforcement tubes 16 of the present disclosure are not limited in any way to these dimensions. Further, while four reinforcement tubes 16 are shown (in later figures) to fill the four oil feed holes 11 and alignment holes 14, it is within the scope of the present disclosure to use any number of reinforcement tubes 16 to accommodate any number of oil feed holes 11 of housing 10 and alignment holes 14 of transmission case 12, depending upon the transmission design.

Figure 4:
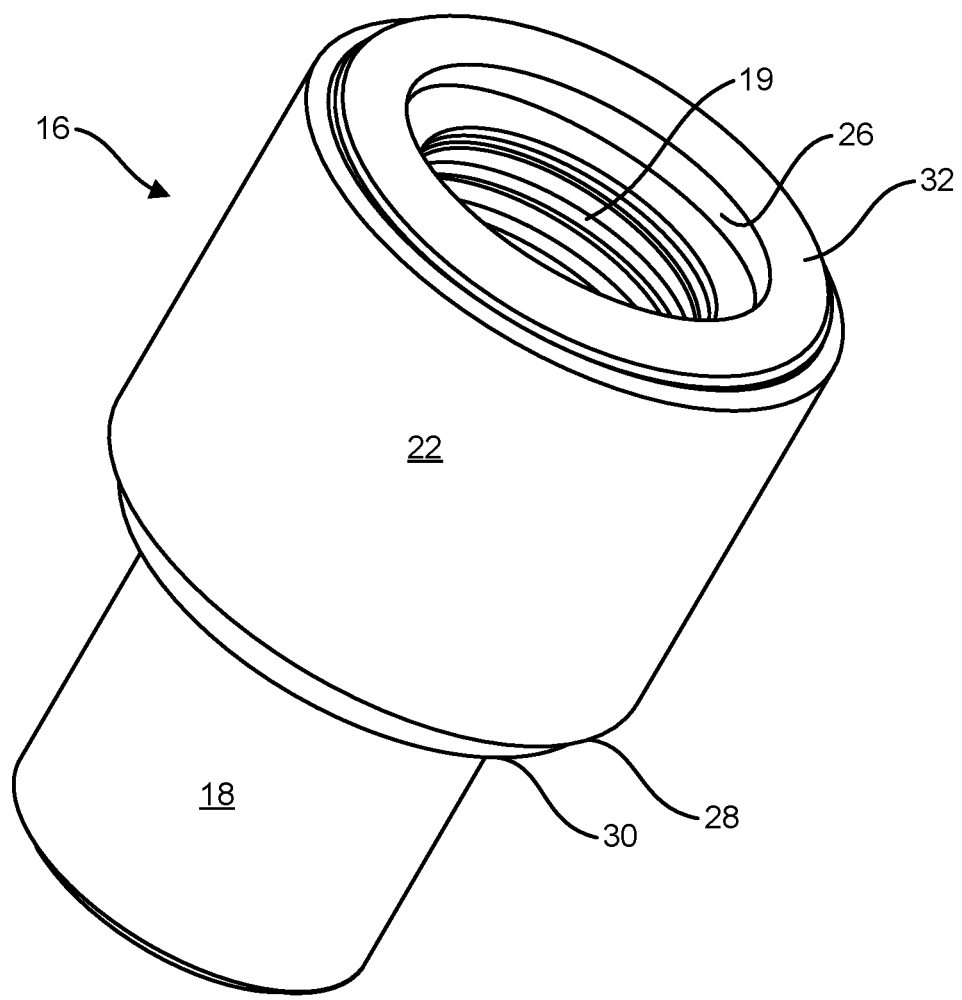
FIG. 4 is a perspective view of the reinforcement tube with multiple seals in accordance with the principles of the present disclosure.
Figure 8:
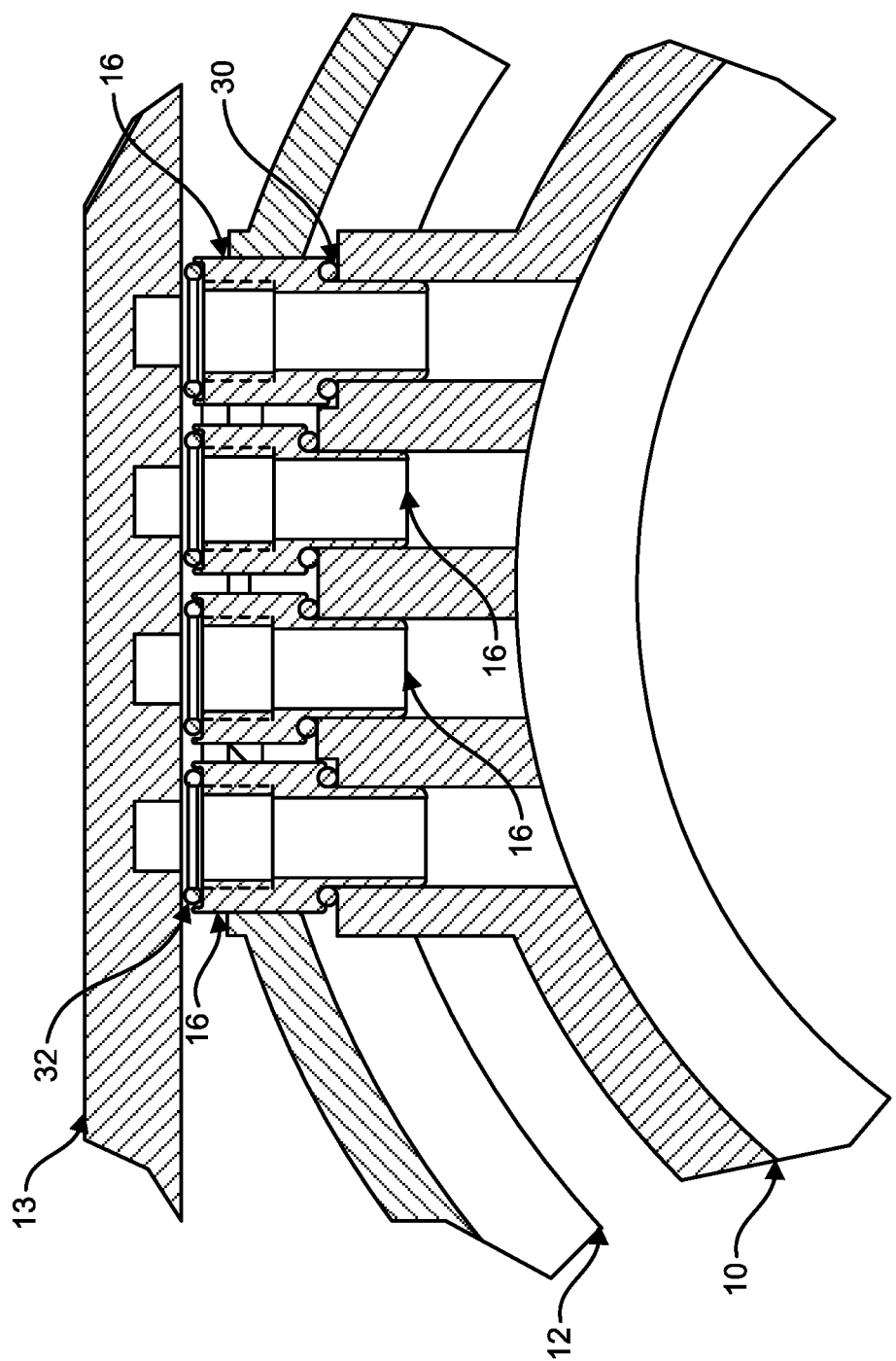
FIG. 8 is a cross-sectional view showing the reinforcement tubes of the present disclosure securing the valve body to the housing.

In FIG. 4, in one embodiment, reinforcement tube 16 can be seen with a first seal, 30 disposed within the first interior recess (not shown) of first portion 18. First seal 30 can be, for example, an O-ring, or any other type of seal. The present disclosure is not limited to the type of seal used. First seal 30 is situated proximate shoulder 28, which separates first portion 18 from second portion 22. A second seal 32 can be seen within second interior recess 26 of second portion 22. Again, second seal 32 can be an O-ring, but is not limited in this regard, and can be any type of seal. In certain embodiments, second seal 32 is situated at the distal end of reinforcement tube 16 and separate from first seal 30, as shown in FIG. 4. Thus, in the embodiment depicted in FIG. 4, reinforcement tube 16 utilized two seals; a first seal 30, which is situated at shoulder 28 and a second seal 32, which is situated at the top of second portion 22. Because first portion 18 of each reinforcement tube 16 resides within a corresponding oil feed hole 11 of housing 10, first seal 30 advantageously provides a secure seal to housing 10. Further, because the valve body 13 is bolted to transmission case 12, the valve body 13 resides on top of each reinforcement tube 16, and the second seal 32 of each reinforcement tube 16 provides a secure seal to the valve body 13. Thus, in this double seal embodiment, the reinforcement tubes 16 of the present disclosure provide a secure hydraulic connection of the valve body 13 to housing 10. The result is a secure connection of the valve body 13 to housing 10, where movement of housing 10 is virtually eliminated. This arrangement is shown in FIG. 8 and further described below.

As described above, when housing 10 resides within transmission case 12, oil feed holes 11 are aligned with transmission case alignment holes 14, as shown in FIG. 2. It is through these aligned holes that reinforcement tubes 16 are inserted (shown in FIGS. 6-8). Thus, when reinforcement tubes 16 are inserted through the alignment holes 14, first portion 18 resides beneath the surface of transmission case 12 and within the oil feed holes 11 of housing 10 and second portion 22 resides within and protrudes above the surface of transmission case 12. This arrangement provides an interference fit between the oil feed holes 11 and first portion 18 of each reinforcement tube 16. Further, second portion 22 of each reinforcement tube 16 has an interference fit with transmission case 12 via alignment holes 14. The result is that housing 10 is locked to transmission case 12, through which second portions 22 of reinforcement tubes 16 extend.

The purpose of first seal 30 and second seal 32 is to provide a seal to both housing 10 and the valve body 13. First seal 30, which is situated at shoulder 28, seals housing 10 while second seal 32 provides a seal for the valve body 13, which is secured to the transmission case 12. First seal 30 is secured to housing 10 when reinforcement tube 16 is pressed into housing 10.

Figure 5:
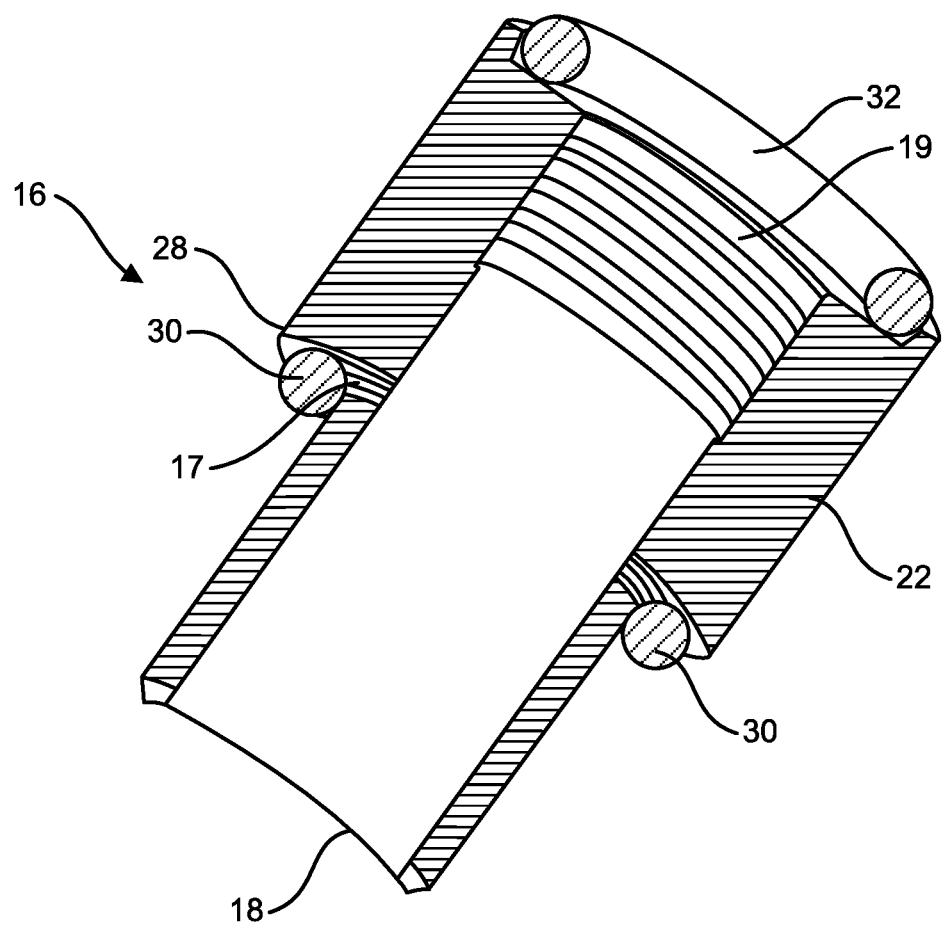
FIG. 5 is a cross-sectional view of the reinforcement tube in accordance with the principles of the present disclosure.

FIG. 5 shows a cross-sectional view of reinforcement tube 16 of the present disclosure, with both seal 30 and 32 in place. In this view, first interior recess 17 can be seen. First interior recess 17 is situated proximate shoulder 28, which separates first portion 18 from second portion 22. First interior recess 17 is configured to receive and secure first seal 30, discussed above.

Figure 6:
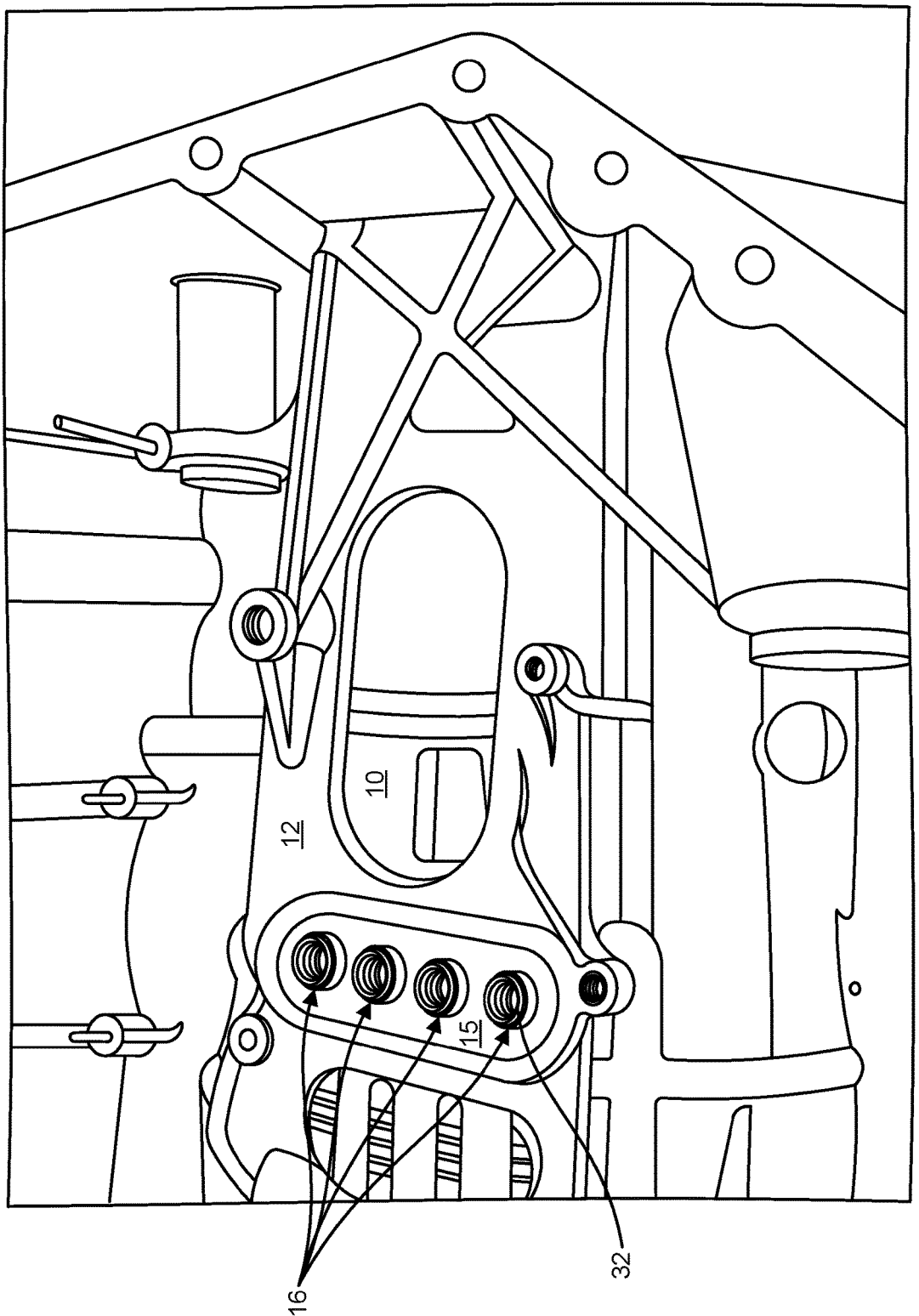
FIG. 6 is an illustration showing the housing inserted within a transmission casing and the reinforcement tubes of the present disclosure in place.
Figure 7:
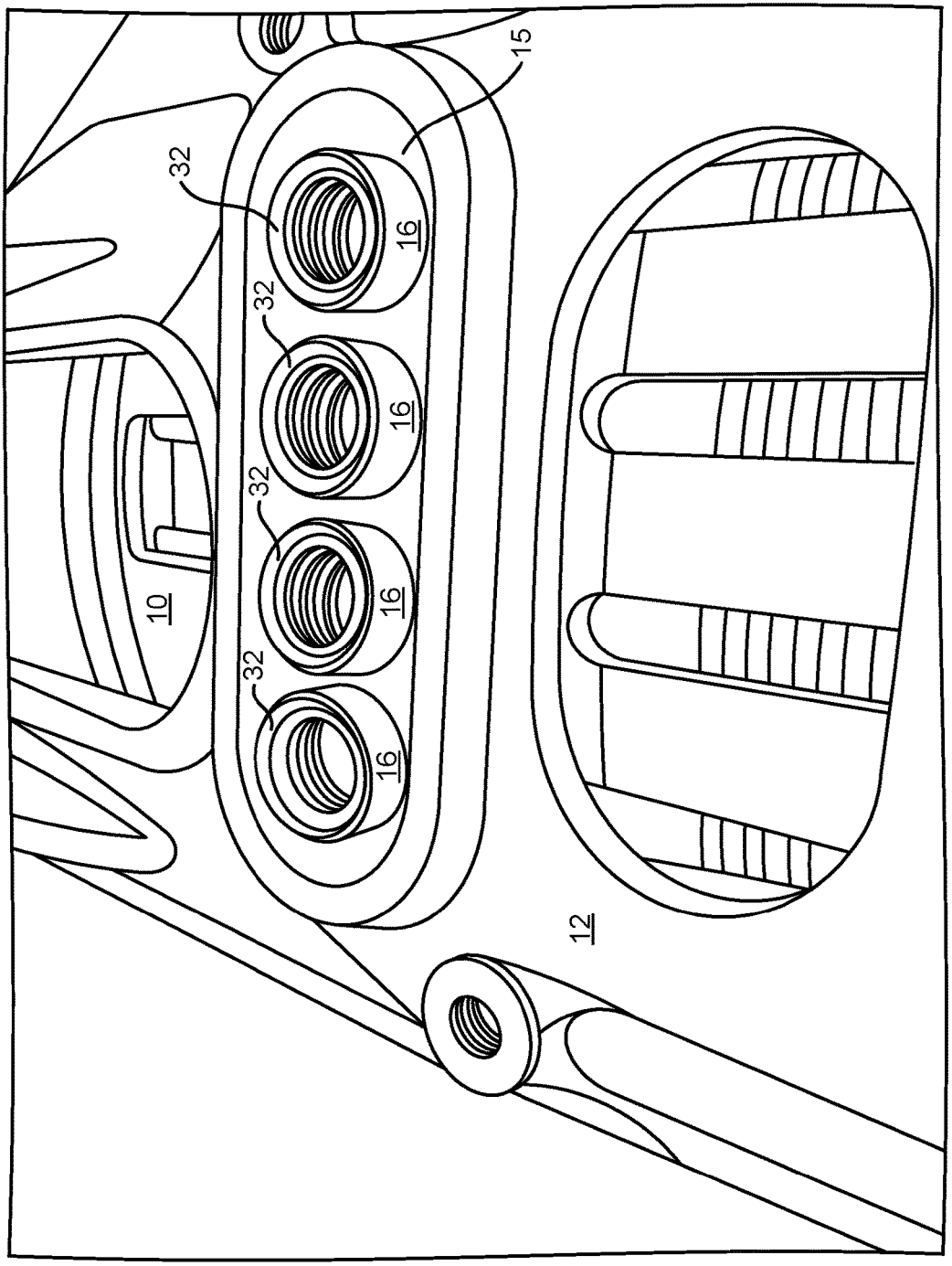
FIG. 7 is an illustration showing the reinforcement tubes of the present disclosure in place securing the housing within the transmission casing.

In FIGS. 6 and 7, four reinforcement tubes 16 can be seen inserted and secured within the aligned oil feed holes 11 (not shown) of housing 10 and transmission case alignment holes 14 of transmission case 12. The four reinforcement tubes 16 secure housing 10 to transmission case 12, thus preventing any unwanted motion of housing 10. Second seal 32 can be seen on each reinforcement tube 16. The valve body 13 will be bolted to the transmission case 12, thus securing the valve body 13 to transmission case 12. The second seal 32 of each reinforcement tube 16 provides a seal for the valve body 13. The first seal 30 of each reinforcement tube 16 resides beneath transmission case 12 and seals the housing 10. As described above, the first portion 18 of each reinforcement tube 16 provides an interference fit with the oil feed holes 11, while the second portion 22 of each reinforcement tube 16 provides an interference fit with a corresponding alignment hole 14 of transmission case 12. The first seal 30 of each reinforcement tube 16 seals housing 10 and the second seal 32 of each reinforcement tube 16 seals the valve body 13.

FIG. 8 is a cross-sectional view showing the reinforcement tubes of the present disclosure securing the housing 10 to the transmission case 12. The view of FIG. 8 is from the perspective of direction "A" of FIG. 1. A series of reinforcement tubes 16 can be seen joining housing 10 to transmission case 12, as described above. By providing a secure connection between housing 10 and transmission case 12, movement of housing 10 is eliminated. As shown in FIG. 8, valve body 13 is securing both seals 30 and 32 on each of the reinforcement tubes 16. Thus, the reinforcement tubes 16 of the present disclosure provides a connection from valve body 13 through transmission case 12 to housing 10. So in addition to providing a mechanical connection between transmission case 12 and housing 10, reinforcement tubes 16 also provide a hydraulic connection between valve body 13 and housing 10.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. An automatic transmission alignment assembly comprising:
   an automobile transmission case having a plurality of transmission case alignment holes;
   a housing having a plurality of oil feed holes; and
   a plurality of reinforcement tubes configured to be secured between the oil feed holes in the housing and corresponding alignment holes in a transmission case thereby joining the housing to the transmission case and providing a hydraulic circuit between a valve body and the housing, each reinforcement tube comprising:
   a first portion having a first diameter and having a first interior recess; and
   a second portion having a second diameter that is larger than the first diameter, and a second interior recess, the first and second portions separated by a shoulder.

2. The alignment assembly of claim 1, wherein each reinforcement tube is sized to be received within a corresponding oil feed hole of the housing and a corresponding alignment hole of a transmission case, thereby connecting the housing to the transmission case.

3. The alignment assembly of claim 2, wherein the first portion of each reinforcement tube provides an interference fit with corresponding oil feed holes of the housing.

4. The alignment assembly of claim 2, wherein the second portion of each reinforcement tube provides an interference fit with corresponding alignment holes of the transmission case.

5. The automatic transmission alignment assembly of claim 1,
   wherein at least one of the plurality of reinforcement tubes further comprises a first seal disposed within the first interior recess of the first portion and situated proximate the shoulder separating the first and second portions; and
   a second seal separate from the first seal and situated proximate a distal end of the second portion.

6. The automatic transmission alignment assembly of claim 5, wherein the first and second seals are O-rings.

7. A method for stabilizing a housing within an automobile transmission casing, the method comprising:
   aligning oil feed holes on a housing with transmission case alignment holes on an automatic transmission case; and
   inserting a plurality of reinforcement tubes within the aligned oil feed holes and transmission case alignment holes, each reinforcement tube comprising a first portion and a second portion, the first portion providing an interference fit with corresponding oil feed holes of the housing, and the second portion providing an interference fit with corresponding alignment holes of the transmission case.

8. The method of claim 7, wherein each reinforcement tube comprises a first portion having a first diameter and having a first interior recess, and a second portion having a second diameter that is larger than the first diameter, and a second interior recess, the first and second portions separated by a shoulder.

9. The method of claim 8, wherein at least one of the plurality of reinforcement tubes comprises at least one of a first seal disposed within the first interior recess of the first portion and situated proximate the shoulder separating the first and second portions, and a second seal separate from the first seal and situated proximate a distal end of the second portion.

10. The method of claim 9, wherein the first and second seals are O-rings.

11. The method of claim 7, wherein the reinforcement tubes forms a hydraulic connection between a valve body and the housing.

* * * * *